Figure 1:
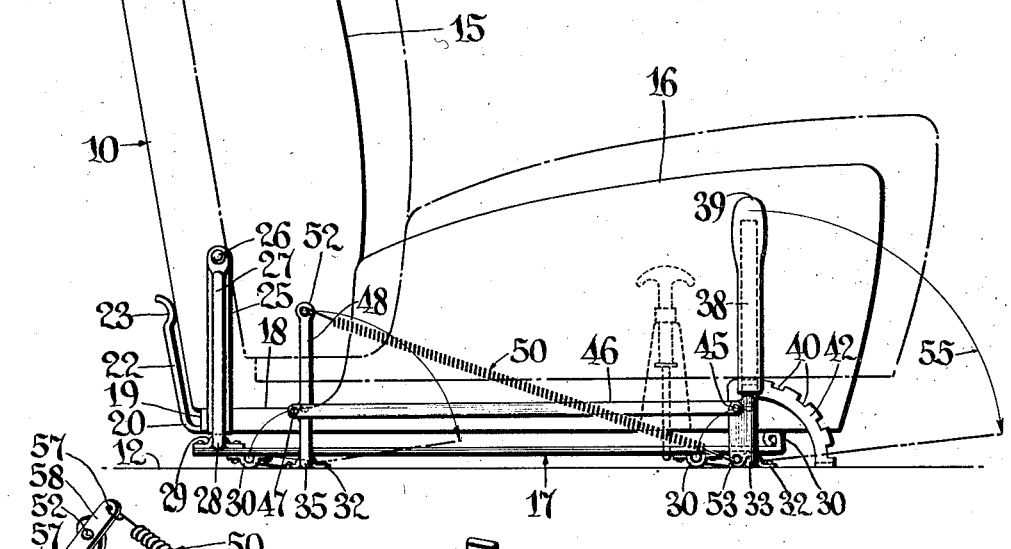

Feb. 16, 1937. A. A. GRINNELL 2,071,032
SEAT LIFTING MECHANISM
Filed Feb. 5, 1934

INVENTOR
Albert A. Grinnell.
BY
Bean & Brooks.
ATTORNEYS

Patented Feb. 16, 1937

2,071,032

UNITED STATES PATENT OFFICE 2,071,032

SEAT LIFTING MECHANISM

Albert A. Grinnell, Medina, N. Y., assignor to Whedon, Inc., Medina, N. Y.

Application February 5, 1934, Serial No. 709,861

8 Claims. (Cl. 155—14)

This invention relates to adjustable seats for use in vehicles, or for other purposes, and it has particular relation to an improved operating arrangement for a seat structure wherein seat supporting members, seat back and seat bottom can be relatively moved to conform readily to various sizes and physical characteristics of different types of persons, and in such manner that persons of various sizes can assume upright, reclining or semi-reclining position with ease and comfort.

The invention is concerned with improved controlling devices adapted to be incorporated in an adjustable seat structure, such as that described generally in the application of Albert A. Grinnell, Serial No. 694,815, filed October 23, 1933, wherein an occupant while seated may adjust the elements of the seating structure to provide comfortable upright seating posture, or the seat may be so adjusted that the seat bottom is moved, as to its angular relation to the horizontal, in order to raise or lower portions thereof in conformity with the physical characteristics of an individual, or the seat bottom may be moved bodily to various horizontal positions, while portions of the seat back can be adjusted forwardly and rearwardly at will, in addition to following in part the movement of the seat bottom.

One of the principal features of the invention is exemplified in the provision of a seat raising or lifting mechanism wherein the lifting forces for adjusting the seat structure can be relatively evenly distributed, and wherein most favorable leverage is transmitted from a manually operable device to both the front and rear portions of the seat bottom in the manipulation of the seat structure. In this construction, an arrangement is provided wherein the initial raising or lifting movement of the seat structure is possible by a simple operation and without imposing undesirable exertion on the part of the operator. This advantageous feature obtains throughout the limits of movement of the adjustable structure while the operator is seated thereon.

Figure 2:
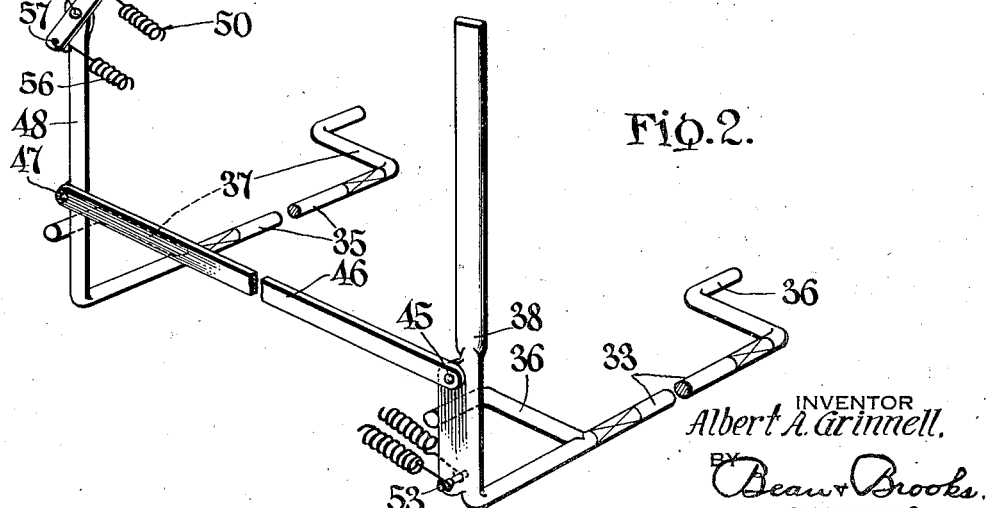

In the drawing:

Fig. 1 is a side elevation of a seat structure having the invention incorporated therein; and Fig. 2 is a fragmentary perspective of the principal features of the invention and embodying a slightly different form of spring arrangement from that shown in Fig. 1.

In practicing the invention a seat structure 10 is installed upon a suitable support 12 which can be in the form of a vehicle floor or the like, and includes separately assembled seat back 15 and seat bottom 16 supported upon a seat controlling and operating mechanism 17 which is frame-like in structure.

A suitable frame 18 forming the lower portion of the seat bottom has a rear extension 19 for receiving the lower portion of the seat back 15 which rests under its own weight thereon, and such extension is provided with a bracket 20 extending upwardly to form a slightly resilient arm 22 for limiting the rearward movement of the lower portion of the seat back upon the frame 18. A bearing member 23 formed upon the upper portion of the arm bears against the lower rear portion of the seat back in order to maintain this lower portion in proper relation to the adjacent portion of the seat bottom with which it moves. It is, of course, to be understood that the arm 22 and the bearing 23 can be as wide as necessary for properly maintaining the seat back against displacement, or more than one arm and bearing can be appropriately arranged adjacent each lower rear portion of the seat.

Each side of the frame 18 adjacent the rear thereof is provided with a stirrup bar 25 rigidly secured thereto and the upper end of each bar is provided with a pivotal connection 26 that is secured to the upper end of a normally upright arm 27 of a transverse rocker 28 rotatably mounted in a bearing bracket 29 upon the rear portion of the frame structure 17. The front portion of the frame structure is provided with an upwardly turned and rounded bearing portion 30 upon which the front end portion of the seat bottom is slidably supported. This arrangement is operable to raise or lower, in forward and rearward movement, the rear portion of the seat bottom in substantially the same manner as the similar structure described in detail in the co-pending application, Serial No. 694,819, mentioned above, and hence, it is readily understood that the rear portion of the seat bottom is suspended upon each side through the stirrup bar 25 to the upper end of the rocker arm 27.

Suitable bearing plates 30 and 32 are secured to the lower surface of the frame 17 and to the floor support 12, respectively, and these plates rotatably support a front rocker 33 and a rear rocker 35 having front and rear arms 36 and 37, respectively, formed integrally therewith for supporting the frame 17. It will be noted that the outer ends of the arms, which are in the form of crank arms, are rotatably carried in the bearing plates 30. Thus the seating structure in various positions of upward and forward movement is supported from the full line position shown in Fig. 1 to the broken line position shown in the same figure.

As best shown in Fig. 2, the forward rocker 33 adjacent one side of the seat is provided with an integral manipulating lever 38 that projects radially at a location substantially 90 degrees from the projection of the crank arms 36 with respect to the axis of the rocker bearing in the front bearing plates 32. A manually operable handle 39 is slidably disposed upon the outer end of the lever 38 and its inner end is adjustable in notches 40 formed in an arcuate bracket 42 that is rigidly secured to the floor 12. An intermediate portion of the lever is provided with a pivotal connection 45 to which one end of a link 46 is secured, while the other end of the link has a similar pivotal connection 47 to an intermediate portion of a lever 48 extending integrally from the rear rocker 35 and positioned at a location approximately 90 degrees from the direction of projection of the crank arms 37 with respect to the axis of the rocker bearing in the rear bearing plates 32. Thus, when the rocker arms 36 and 37 are disposed substantially horizontally, as shown in Fig. 1, the levers 38 and 48 are disposed substantially vertically. The link 46 is movable upwardly and downwardly but remains in a substantially horizontal position.

A spring structure 50 at one extremity is secured to a connection 52 at the outer end of the lever 48 and the other end of the spring structure has a suitable connection 53 to the inner end portion of the front lever 38. Normally the spring structure is under tension and tends to rock the lever 48 about the axis of the rocker 35 in a clockwise direction, as viewed in Fig. 1. By releasing the handle 39 from the notched bracket 42 and pivoting it forwardly in the direction of the arrow 55, like pivoting action is transmitted through the link 46 to the rear lever 48. At the same time the spring structure exerts a forward pivoting action upon the outer end of the rear lever 48. It will be observed that the lever 48 is more than twice as long as the rear rocker arm 37, and hence, the spring structure aids materially in applying lifting force to the seat structure through the rear crank arm.

Referring to Fig. 2, it will be observed that the spring structure 50 can be in the form of a plurality of tension springs 56 having their upper ends connected, as indicated at 57, to the outer end portions of an equalizing bar 58 which in turn has its intermediate portion pivotally carried upon the connection 52 at the end of the lever. The lower ends of the springs 56 are connected upon the pivotal connection 53 adjacent the inner portion of the manipulating lever. If the link 46 and the rear lever 48 were omitted, the force for raising the rear portion of the seat would be transmitted through the frame structure 17, and hence, in the position shown in Fig. 1, the lines of force exerted through the frame structure and the rear crank arm 37 would be opposed at very sharp acute angles. Hence, the improved structure described materially aids in manipulating the entire seat structure by operating the handle at the forward portion of the seat and transmitting the lifting force under favorable leverage conditions through the link to the lever 48 which is upright. After the rocker arms 36 and 37 have been pivoted upwardly, e. g. to a position approximately 45 degrees to the vertical, they too provide for more favorable lever action in transmitting lifting action to the rear portion of the seat structure.

In order to provide proper adjustment of the seat back 15, a stationary support 60, which may be a portion of the vehicle frame in which the seat is mounted, is provided with a pivotal connection 62 for supporting one end of an arcuate arm 63 that is provided with a series of ratchet like teeth 65. These teeth are adapted to engage a cooperating bolt 66 mounted in the upper portion of the seat back, thus providing for adjustment of the seat back toward and away from the support and permitting upward and downward movement thereof according to the adjustment of the seat bottom support. A detailed description of the construction and operation of this adjusting structure is set forth in the co-pending application Serial No. 703,462, of Whedon and Grinnell, filed December 21, 1933.

Although only one form of the invention has been shown and described in detail, it will be apparent to those skilled in the art that the invention is not so limited and that various changes may be made therein without departing from the spirit of the invention or from the scope of the appended claims.

I claim:

1. In an adjustable seat structure, a seating member, forward rocker arms pivotally connected to forward portions of the seating member, rear rocker arms pivotally connected to rear portions of the seating member, bearings mounted upon the rigid support and supporting said rocker arms for rocking movement about horizontal axes, a lever rigid with one front rocker arm and extending at angle to the latter, a second lever rigid with one rear rocker arm and extending at an angle to the latter, means connecting said levers for transmitting rocking force to the rocker arms to which the levers are connected, resilient means having one extremity connected to an outer end portion of one rigid lever and having its opposite extremity connected to the other lever adjacent the connection to its rocker arm for exerting rocking force tending to rock the rocker arms.

2. In an adjustable seat structure including a rigid support, a seating member, rockers having pivotal connection to the rigid support and having offset cranked portions pivotally connected to the seating member and movable to carry the seating member upwardly and forwardly to various positions of adjustment, means for rocking one of the rockers, means spaced from the pivotal connection to the rigid support and connected to said rockers in spaced relation to the cranked portions of the rockers for transmitting rocking action from one of the rockers to another, and means for securing the rockers in various positions of adjustment.

3. In an adjustable seat structure including a rigid support, a seating member, rockers having pivotal connection to the rigid support and having offset cranked portions pivotally connected to the seating member and movable to carry the seating member upwardly and forwardly to various positions of adjustment, means for rocking one of the rockers, means spaced from the pivotal connection to the rigid support and connected to said rockers in spaced relation to the cranked portions of the rockers for transmitting rocking action from one of the rockers to another, resilient means connected to the last mentioned means for augmenting the rocking action of one of the rockers, and means for securing the rockers in various positions of adjustment.

4. In an adjustable seat structure including a support, a seating member, forward and rear rockers movable to carry the seating members upwardly and forwardly to various positions of adjustment, bearings pivotally supporting the rockers on said rigid support, said rockers having a plurality of members extending substantially radially from the respective axes of the rocker bearings and supporting forward and rear portions of the seat member, said rockers having an additional plurality of members extending substantially radially from the respective axes of the rocker bearings and extending angularly with respect to the first mentioned plurality of members, and means connected to said additional plurality of members of the forward and rear rockers for transmitting rocking action from one rocker to the other, and means for securing the rockers in various positions of adjustment.

5. In an adjustable seat structure including a rigid support, a forward rocker having a forward rocker arm for pivotally supporting the forward seating portion of the seat structure, a rear rocker having a rocker arm for pivotally supporting the rear seating portion of the seat structure, a bearing for pivotally supporting each of the rockers upon said rigid support, a lever extending radially from the axis of the bearing of the forward rocker and at an angle to the forward rocker arm, a second lever extending radially from the axis of the bearing of the rear rocker and at an angle to the rear rocker arm, means connecting said levers for transmitting rocking action from one rocker to the other, and means for securing the rockers in various positions of adjustment.

6. In an adjustable seat structure including a rigid support, a forward rocker having a forward rocker arm for pivotally supporting the forward seating portion of the seat structure, a rear rocker having a rocker arm for pivotally supporting the rear seating portion of the seat structure, a bearing for pivotally supporting each of the rockers upon said rigid support, a lever extending radially from the axis of the bearing of the forward rocker and at an angle to the forward rocker arm, a second lever extending radially from the axis of the bearing of the rear rocker and at an angle to the rear rocker arm, means connecting said levers for transmitting rocking action from one rocker to the other, mechanism cooperating with one of the levers for manually adjusting the rockers, and means tending to rock the one lever to supplement the rocking action transmitted to the other lever.

7. In an adjustable seat structure including a rigid support, a forward rocker having a forward rocker arm for pivotally supporting the forward seating portion of the seat structure, a rear rocker having a rocker arm for pivotally supporting the rear seating portion of the seat structure, a bearing for pivotally supporting each of the rockers upon said rigid support, a lever extending radially from the axis of the bearing of the forward rocker and at an angle to the forward rocker arm, a second lever extending radially from the axis of the bearing of the rear rocker and at an angle to the rear rocker arm, means connecting intermediate portions of said levers for transmitting rocking action from one rocker to the other, mechanism cooperating with one of the levers for manually adjusting the rockers, and means acting upon the other lever at a location radially outwardly of the connection of said first mentioned means thereto and exerting supplemental rocking force upon the rockers.

8. In an adjustable seat structure including a rigid support, a seating member, a forward rocker having a forward rocker arm extending rigidly therefrom, a rear rocker having a rear rocker arm extending rigidly therefrom, bearing means connecting the rockers to the rigid support, means for connecting the forward and rearward rocker arms to forward and rearward portions of the seating member whereby the latter is movable upwardly and forwardly upon the rocker arms, an extension projecting rigidly and angularly from one rocker arm, means connecting said extension to the other rocker arm for constantly exerting force upon said rocker arms tending to rock them in one direction, and means for securing the rocker arms in various positions of adjustment.

ALBERT A. GRINNELL.